Nov. 10, 1936.                E. M. DAVIS                2,060,557
                              MIXING DEVICE
                            Filed July 25, 1934
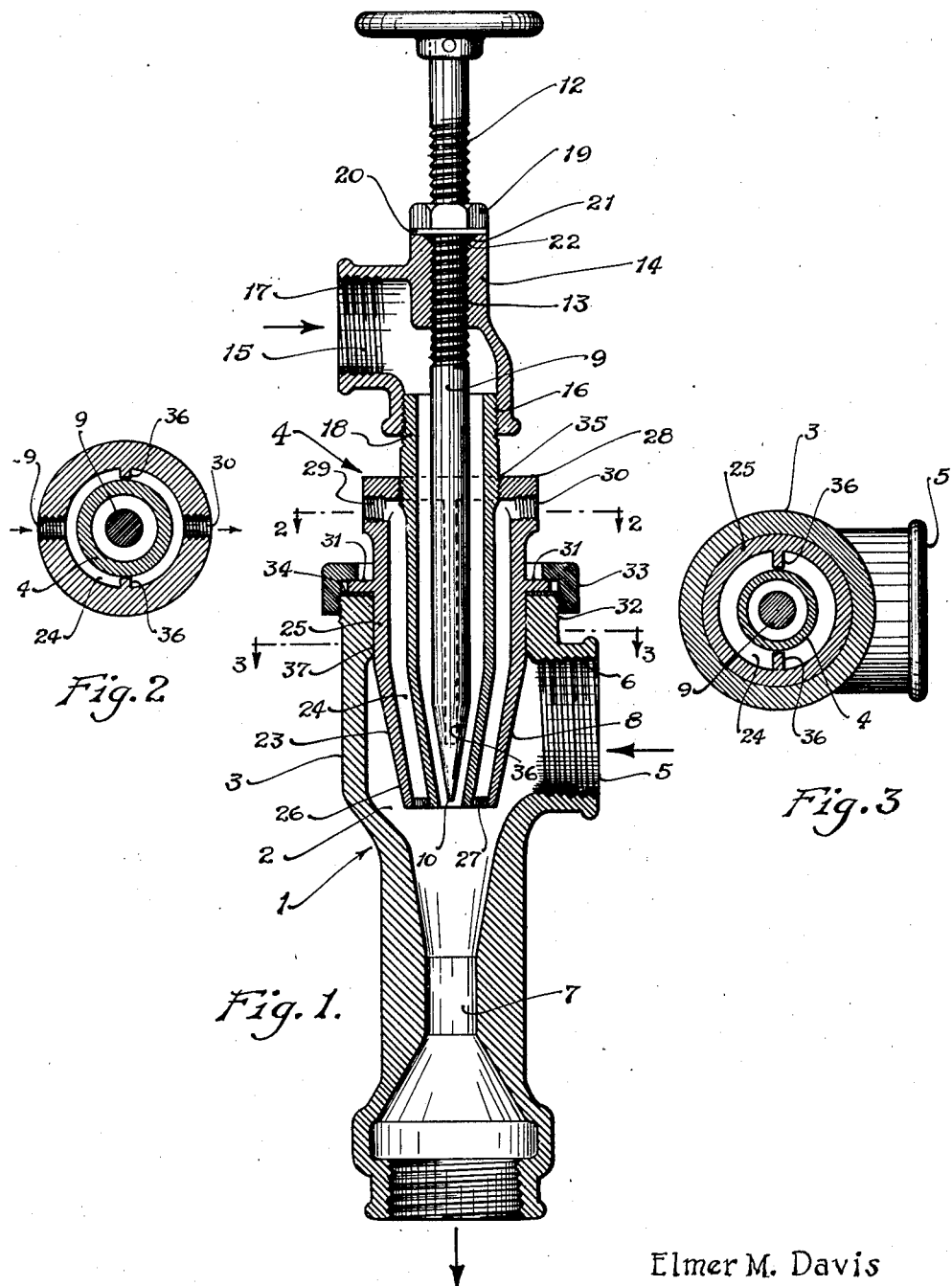
Elmer M. Davis
INVENTOR Patented Nov. 10, 1936

2,060,557

UNITED STATES PATENT OFFICE 2,060,557

MIXING DEVICE

Elmer M. Davis, Chicago, Ill., assignor to Industrial Patents Corporation, Chicago, Ill., a corporation of Delaware Application July 25, 1934, Serial No. 736,844

12 Claims. (Cl. 261—15)

The invention relates to a mixing device.

One of the objects of the invention is to provide a simple, practical and comparatively inexpensive mixing device of strong and durable construction designed for deodorizing cream and similar operations and equipped with means for injecting steam into the cream as the latter enters the mixing device and provided also with means for cooling the steam injecting means sufficiently to avoid scorching of the cream as it enters the mixing device and is subjected to the action of the steam.

A further object of the invention is to provide a mixing device of this character having a water cooled steam injector adapted to permit the introduction of the cream into the mixing device at the discharge portion of the steam injector without liability of any scorching of the cream or other material.

With these and other objects in view, the invention consists in the construction and novel combination and arrangement of parts hereinafter fully described, illustrated in the accompanying drawing and pointed out in the claims hereto appended, it being understood that various changes in the form, proportion and minor details of construction, within the scope of the claims, may be resorted to without departing from the spirit or sacrificing any of the advantages of the invention.

In the drawing:—

Figure 1 is a longitudinal sectional view of a mixing device constructed in accordance with this invention.

Figure 2 is a transverse sectional view on the line 2—2 of Fig. 1.

Figure 3 is a similar view on the line 3—3 of Figure 1.

In the accompanying drawing in which is illustrated one embodiment of the invention I designates a tubular body forming a longitudinal passage 2 and enlarged at its upper or outer end portion 3 to receive an injector 4. The enlarged upper portion 3 of the tubular body I is provided at one side with a lateral inlet 5 for cream when the mixing device is employed in deodorizing cream, but the mixing device is also adapted for use in similar operations. While the enlarged portion 3 is referred to as the upper portion of the tubular body for convenience, it will be readily understood that the mixing device may be operated in any convenient position.

The lateral inlet 5 is interiorly threaded at 6 for connecting the mixing device with a feed pipe (not shown) or other suitable means for introducing the cream thereto.

The inner or lower portion 7 of the longitudinal passage 2 of the tubular body I is contracted cross-sectionally to provide a venturi formation which produces an intimate mixing or commingling of the cream and steam, as will be readily understood.

The steam injector 4 is provided with a tapered lower portion or nozzle 8 which forms a seat for a needle valve 9. The needle valve 9 has a tapered inner or lower portion 10 which cooperates with the seat to control the discharge of steam therefrom. The outer or upper portion 12 of the needle valve is threaded and is mounted in a threaded opening 13 of an enlargement 14 of an L-shaped coupling 15. The L-shaped coupling 15 is interiorly threaded at its ends at 16 and 17. The inner end of the coupling is screwed on the outer end 18 of the steam injector which is exteriorly threaded, as clearly illustrated in Figure 1 of the drawing. The coupling 15 constitutes a section of the injector and the outer end thereof is designed to be connected with any suitable source of steam supply.

The needle valve is adjustable in the threaded opening 13 of the enlargement 14 and it is located in its adjustment by a hexagonal jam nut 19, a washer 20 being interposed between the jam nut and the end of the enlargement 14 and a packing 21 of asbestos or other suitable material being preferably provided. The enlargement 14 extends upwardly beyond the adjacent wall of the coupling and its outer end is provided at the threaded opening with a tapering recess 22 in which the packing is arranged. The tapering recess presents inclined walls to the packing and enables the same to be tightly compressed around the needle valve to form a steam tight joint to prevent escape of steam.

The steam injector is provided with a jacket forming sleeve 23 spaced from the injector except at the ends to provide an intervening water space 24 for enabling cold water to be continuously circulated around the nozzle of the steam injector to cool the same sufficiently to prevent the cream entering the inlet 5 from being scorched by the steam injector. The jacket forming sleeve 23 consists of a substantially cylindrical upper or outer portion 25 and a tapered lower portion 26 conforming to the configuration of the tapered portion of the nozzle and arranged in substantial parallelism therewith and provided at its inner end with an end wall 27 closing the end of the intervening space 24.

The end wall 27 may be conveniently formed by welding the ends of the jacket and the nozzle together or in any other suitable manner, as will be readily understood. The intervening space between the sleeve and the nozzle is closed at the outer or upper end by an end wall 28 formed integral with the sleeve which is provided adjacent the upper end wall at diametrically opposite points with inlet and outlet openings 29 and 30 which are located beyond the upper or outer end of the tubular body 1. The cylindrical portion 25 of the sleeve fits within a cylindrical end portion 37 of the tubular body and it is provided intermediate of its ends with an exterior annular flange 31 which fits against the outer or upper end of the tubular body 1 and the latter is exteriorly threaded at its upper end at 32 for the reception of a flanged collar 33 which engages the flange 31 and secures the steam injector to the upper or outer end of the said body 1. A suitable packing 34 is preferably interposed between the flange 31 and the adjacent end of the body 1. The threaded collar 33 detachably secures the steam injector through the body and enables the injector to be readily removed when desired. The outer end wall 28 of the sleeve is suitably secured to the steam injector and this may be effected by threading the parts, as indicated at 35, or any other suitable means.

The sleeve is provided at diametrically opposite points with longitudinal baffles 36 preferably formed integral with the jacket forming sleeve and extending from the upper end wall thereof to a point adjacent to but spaced from the lower end of the intervening space 24 for causing the cold water entering through the water inlet 29 to flow longitudinally along the injector nozzle at one side thereof and across the inner end of the steam injector nozzle and longitudinally along the opposite side of the nozzle to the outlet 30. By circulating the cold water through the jacket space 24 the steam injector is maintained sufficiently cool to prevent scorching of the cream introduced into the tubular body 1 at the inlet 5. The nozzle of the steam injector extends across the inlet 5 in spaced relation with the same and it provides a relatively narrow annular space between the inner end of the nozzle and the adjacent walls of the body 1 at the inner end of the venturi form portion of the passage within the body 1. The injection of the steam creates a suction to facilitate the flow of the cream through the mixing device and this coupled with the venturi action of the inner or lower portion of the passage of the body 1 produces an intimate mixture and commingling of the cream and the steam and thoroughly subjects the cream to the deodorizing action of the steam. The mixing device may, of course, be employed for any similar or analogous process where it is desired to subject a liquid to the action of steam without liability of the liquid material being scorched or otherwise injuriously affected through contact with the nozzle of the steam injector.

The longitudinal baffles 36 are preferably formed by webs or flanges which are carried by the sleeve, but they may be formed in any other desired manner, as will be readily understood. The water inlet and outlet openings are interiorly threaded as shown, for the attachment of suitable tubes for conveying the cold water to the jacket space 24 and for removing the water from the jacket space. Cooling of the nozzle of the steam injector does not materially affect the temperature of the steam owing to the rapid passage of the same through the nozzle and the discharge of the steam may be readily regulated or controlled by the needle valve. The jacket forming sleeve constitutes the means for detachably securing the steam injector to the tubular body of the mixing device and the water inlet and outlet are located above or outwardly beyond the means for attaching the sleeve to the body 1 so that the water inlet and outlet pipes are readily accessible and in a comparatively cool position.

What is claimed is:

1. A device of the class described comprising a tubular body forming a passage for liquid material and provided at one end with an inlet opening for the liquid material, a steam injector extending into the tubular body at the said end of the same adjacent the said inlet of the body for subjecting the liquid material to the action of the steam, an exteriorly operable needle valve within said steam injector for controlling the flow of steam therethrough, and a jacket forming sleeve surrounding the steam injector and forming a jacket space for the circulation of a cooling medium to prevent the liquid material from being scorched by the steam injector, said sleeve constituting a support for the steam injector and provided with means for securing it to the tubular body.

2. A device of the class described comprising a tubular body forming a passage for liquid material and provided at one end with an inlet opening for the liquid material, a steam injector extending into the tubular body at the said end of the same adjacent the said inlet of the body for subjecting the liquid material to the action of the steam, an exteriorly operable needle valve within said steam injector for controlling the flow of steam therethrough, and a jacket forming sleeve surrounding the steam injector and forming a jacket space for the circulation of a cooling medium to prevent the liquid material from being scorched by the steam injector, said sleeve constituting a support for the steam injector and provided intermediate of its ends with means for securing it to the tubular body and having inlet and outlet openings located outwardly beyond the said attaching means and exteriorly of the tubular body.

3. A device of the class described comprising a tubular body forming a passage for liquid material and provided at one end with an inlet opening for the liquid material, a steam injector extending into the tubular body at the said end of the same adjacent the said inlet of the body for subjecting the liquid material to the action of the steam, a jacket forming sleeve surrounding the steam injector and forming a jacket space for the circulation of a cooling medium to prevent the liquid material from being scorched by the steam injector, said sleeve constituting a support for the steam injector and provided with means for securing it to the tubular body, and longitudinal baffles located in the jacket space and extending inwardly from the outer end thereof for causing the cooling medium to traverse the jacket space longitudinally.

4. A device of the class described comprising a tubular body forming a passage for liquid material and provided at one end with an inlet opening for the liquid material, a steam injector extending into the tubular body at the said end of the same adjacent the said inlet of the body for subjecting the liquid material to the action of the steam, a jacket forming sleeve surrounding the steam injector and forming a jacket space for the circulation of a cooling medium to prevent the liquid material from being scorched by the steam injector, said sleeve constituting a support for the steam injector and provided intermediate of its ends with means for securing it to the tubular body and having inlet and outlet openings located outwardly beyond the said attaching means and exteriorly of the tubular body, and longitudinal baffles arranged in the jacket space and extending inwardly from the outer end thereof and terminating short of the inner end of the same for causing the cooling medium to traverse the jacket space longitudinally in passing from the inlet to the outlet.

5. A device comprising a tubular body provided adjacent one end with a lateral inlet for the introduction of liquid material, a steam injector extending into the tubular body at the said end thereof and also extending across the said inlet in spaced relation with the same in the path of the liquid material to be subjected to the action of the steam, an exteriorly operable needle valve within said steam injector for controlling the flow of steam therethrough, and a jacket forming sleeve surrounding the steam injector and forming a jacket space for the circulation of a cooling medium to prevent the liquid material from being scorched by the steam injector.

6. A device comprising a tubular body provided at one end with a lateral inlet, a steam injector extending into the said end of the body and projecting across the said inlet in the path of material to be subjected to the action of the steam, said body having a portion of its passage of venturi form with one end located at the end of the steam injector and adjacent the lateral inlet of the body whereby the suction produced by the injection of the steam and the venturi action of the said passage will effect a thorough and intimate mixing of the liquid material and the steam, and a jacket forming sleeve surrounding the steam injector and forming a jacket space for a cooling medium for preventing the liquid material from being scorched by the steam injector.

7. A device comprising a tubular body provided at one end with a lateral inlet, a steam injector extending into the tubular body at the said end thereof, an exteriorly operable needle valve within said steam injector for controlling the flow of steam therethrough, a jacket forming sleeve surrounding the steam injector and forming an intervening jacket space for the circulation of a cooling medium, said sleeve being provided intermediate of its ends with an exterior flange fitted against the adjacent end of the tubular body, and a flanged collar engaging the flange of the sleeve and having a threaded connection with the tubular body.

8. A device comprising a tubular body provided at one end with a lateral inlet, a steam injector extending into the tubular body at the said end thereof, a jacket forming sleeve surrounding the steam injector and forming an intervening jacket space for the circulation of a cooling medium, said sleeve being provided intermediate of its ends with an exterior flange fitted against the adjacent end of the tubular body and being provided outwardly beyond the said flange with inlet and outlet openings for the passage of the cooling medium, baffles arranged in the intermediate space for causing the cooling medium to traverse the jacket space longitudinally thereof in passing from the inlet opening to the outlet opening, and a flanged collar engaging the flange of the sleeve and having a threaded connection with the tubular body.

9. A device including a tubular body and having a longitudinal passage and enlarged at one end portion and having a lateral inlet opening thereat, the passage of the tubular body at the other end portion being venturi-shaped, a steam injector extending into the enlarged end of the body and across the lateral inlet opening thereof in spaced relation with the same, a jacket forming sleeve carried by the steam injector and forming a jacket space for the circulation of a cooling medium, said sleeve being provided with means for securing it to the adjacent end of the body and supporting the steam injector thereon, said steam injector comprising a nozzle member and a coupling member connected with the nozzle member and having an enlargement provided with a threaded opening, and a threaded needle valve adjustably mounted in the threaded opening of the said enlargement and co-acting with the nozzle member for controlling the flow of steam through the steam injector.

10. A device for admixing steam with milk and cream to remove foreign flavors and odors therefrom comprising a tubular casing, an inlet in said casing, an outlet in said casing, a passage of venturi form in said casing, a conduit including a valve mounted in said casing, an inlet to said conduit, an outlet to said conduit positioned within said casing, and a jacket forming sleeve surrounding said conduit for the circulation of a chilling medium, the flow from said casing inlet and said conduit outlet being directed through said venturi passage to said casing outlet.

11. A device for admixing steam with milk and cream to remove foreign flavors and odors therefrom comprising a tubular casing, an inlet in said casing, an outlet in said casing, a passage of venturi form in said casing, a conduit mounted in said casing, an inlet to said conduit, an outlet to said conduit positioned within said casing, and a jacket forming sleeve surrounding said conduit for the circulation of a chilling medium, the flow from said casing inlet and said conduit outlet being directed through said venturi passage to said casing outlet.

12. A device for admixing steam with milk and cream to remove foreign flavors and odors therefrom comprising a tubular casing, an inlet in said casing, an outlet in said casing, a passage of venturi form in said casing, a conduit including a needle valve mounted in said casing, an inlet to said conduit, an outlet to said conduit positioned within said casing, and a jacket forming sleeve surrounding said conduit for the circulation of a chilling medium, the said needle valve being provided with means mounted exteriorly of the conduit for controlling the size of the said outlet in said conduit and the flow from said casing inlet and said conduit outlet being directed through said venturi passage to said casing outlet.

ELMER M. DAVIS.